Oct. 27, 1936.                M. T. WINTSCH                2,059,160
                        AUTOMATIC CAB SIGNAL SYSTEM
                          Filed Oct. 13, 1934          3 Sheets-Sheet 3

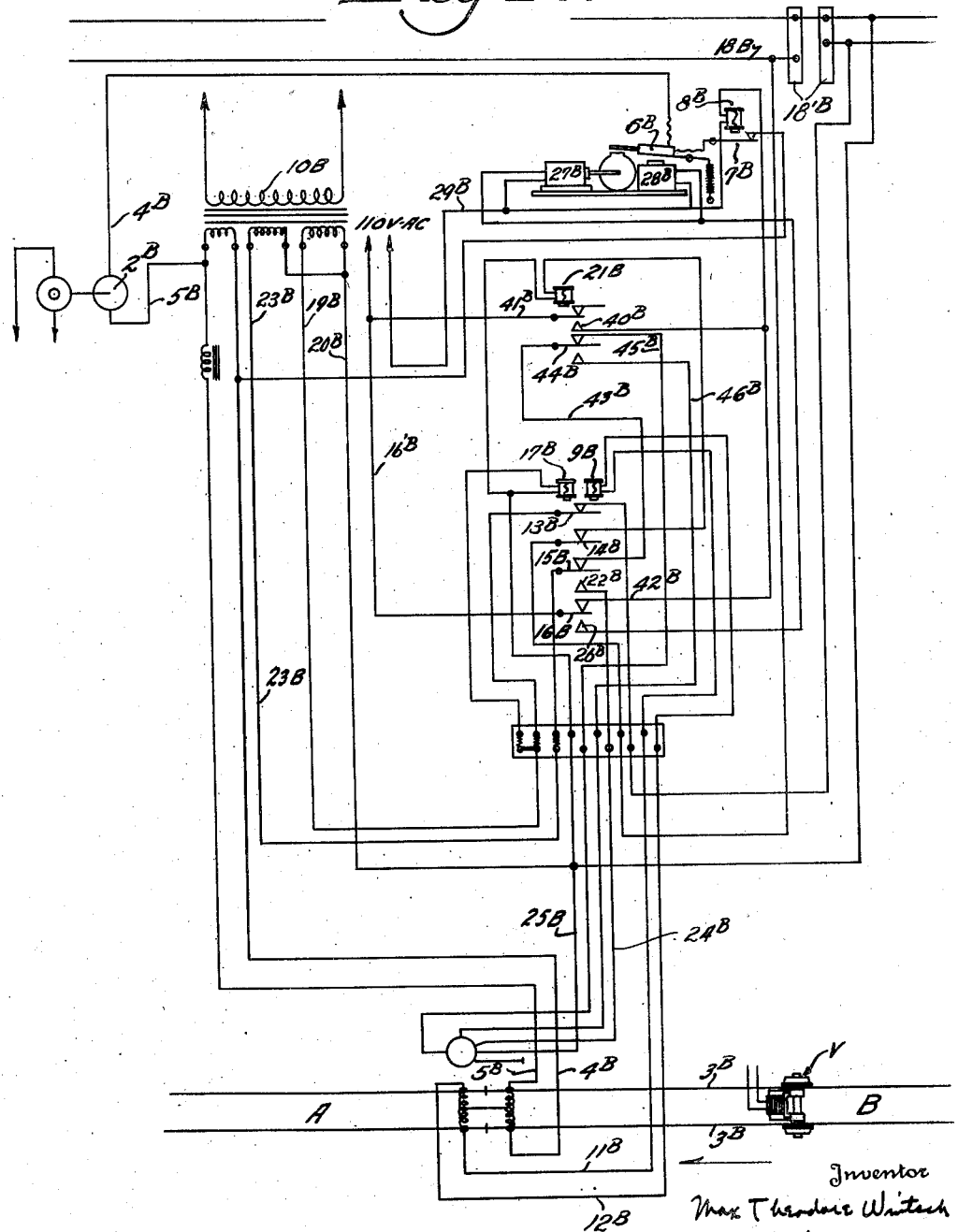

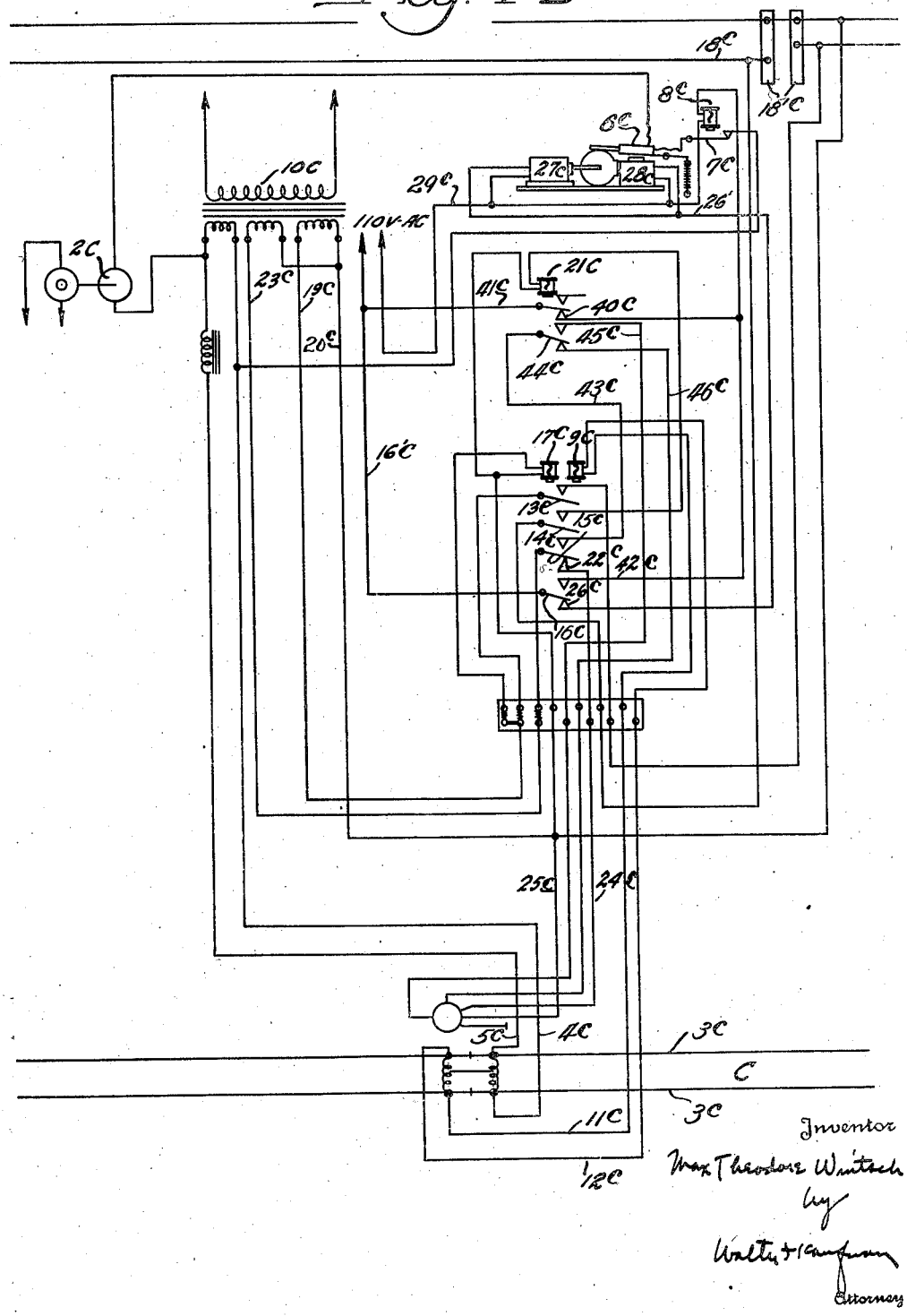

Fig. 2

Fig. 3

Patented Oct. 27, 1936

2,059,160

UNITED STATES PATENT OFFICE 2,059,160

AUTOMATIC CAB SIGNAL SYSTEM

Max Theodore Wintsch, Lancaster, Pa., assignor to Lowell-Wintsch Automatic Train Control, Inc., Lancaster, Pa., a corporation of Delaware Application October 13, 1934, Serial No. 748,252

5 Claims. (Cl. 246—63)

This invention relates generally to an automatic cab signal and more particularly to a system of the type wherein electrical energy supplied to the track rails is communicated to a suitable mechanism, continuously indicating track conditions and, if desired, effective for stopping or otherwise controlling a vehicle on the track. In systems of this general type, the current supplied to the track is varied, as by impressing alternating current of different frequencies thereon, which, upon communication to a control mechanism, is effective for signalling and/or governing the train's operation. The signalling and controlling is generally effected through relays tuned in resonance with the frequency of alternation of the current impressed upon the track rails although in certain control systems, the current supplied to the track rails is varied by means of so-called "coding" devices, and relays tuned to the coded frequency rather than the current frequency are employed for controlling the operation of the vehicle.

While my system is particularly adapted for continuous cab signalling and controlling, it will be understood by those skilled in the art that by simple modification my system may be adapted for use as a discontinuous cab signal and control by the use of track ramps and other mechanism commonly employed in disconinuous type systems.

It is an object of my invention to provide a rail vehicle signal and control system whereby effective signalling and controlling may be readily effectuated by impressing current of but a single frequency upon the track rails and communicating said frequency to a control mechanism responsive only to that frequency.

It is a further object of my invention to provide a system wherein signal current supplied to a given block may be regularly broken or interrupted by traffic controlled means in the next preceding block. The signalling and controlling mechanism will be responsive to varying conditions in the given block as well as the block in advance; the signalling and controlling mechanism being responsive to the current impressed upon the track rails.

It is a further object of my invention to provide a readily discernible signal of the flasher type, the frequency of which may be governed by the interruption of the track rail current.

Another object of my invention is to provide a locking mechanism, manually controlled, whereby upon restricted track conditions the operator must respond to the "restricted" signal if he is to prevent application of the control mechanism.

Another object of my invention is to provide a system suitable for operation on direct current propelled trains, whereby inductive interference from the direct current driving motor fields and interference caused by a difference of potential in the track rails is eliminated.

My invention contemplates, in its preferred embodiment, an automatic electrical signalling and controlling system of the continuous type wherein current supplied to the track rails is interrupted, as by means of a constant speed interrupter, upon changes in track conditions.

In order that my invention may be more readily understood, I will describe the same in connection with the attached drawings in which, Figure 1 (sheets 1A and 1B placed side by side) is a diagrammatic illustration of a preferred embodiment of my invention applied to a standard electric railway provided with right-of-way signals;

Figure 2 is a simplified wiring diagram of the cab signal and control mechanism; and Figure 3 is a view in side elevation of a constant speed interrupter suitable for use in my system.

The system is illustrated in Figure 1 as applied to three block sections A, B and C, with block section B occupied by a vehicle travelling in the direction of the arrow and block sections A and C clear, each block being insulated from the other in the customary manner.

For sake of clarity of description corresponding numbers are used to designate corresponding mechanism employed for the various blocks and, in certain instances, a letter corresponding to the block section letter is appended.

The track current supply system

In my preferred embodiment, current is supplied to the track rails for subsequent communication to the cab signalling and controlling mechanism and the character of the current supplied is controlled by traffic conditions. Referring first to Figure 1A which shows block A clear and block B occupied by a vehicle V, alternating current of a predetermined frequency, which may be, for example, 100 cycles at 10 volts, and which is preferably different than the frequency of current supplied for operation of the vehicle, if it be electrically driven, and different in frequency than the standard track signalling currents but of the same potential as the latter, is conducted from a suitable motor generator set 2 to track rails 3 of block B at the exit end thereof, the current being supplied through conductors 4 and 5 connected to the track rails 3. A single motor-generator set may be employed for a plurality of blocks, but it is preferred to use a single motor-generator set for each block as shown. The conductor 4 passes from the motor-generator set 2 through a normally closed vacuum contact 6 and through a contact 7 operated by a protective relay 8, the operation and function of which will be more fully hereinafter described, and thence to the track rails 3 of block B. From this it will be seen that with block section A clear, current of 100 cycles at 10 volts is continuously impressed upon the rails 3 of block B.

Now referring to Figure 1B, bearing in mind that block B is occupied by the vehicle V, the character of the current supplied to the rails 3 of block C will be changed in the following manner: The vehicle occupying block B will shunt out the current normally supplied to the track rails of block C for operation of a track relay 9C. The current in the present instance is shown as being supplied from a transformer 10B (Figure 1A) and may be 25 cycles at 10 volts, which is conducted to the rails 3 at the exit of block B by the conductors 4 and 5. These conductors are common for supplying both the track relay current and the rail current for operation of the cab signalling and controlling mechanism.

The current for energization of the track relay 9C is picked up at the entrance end of block B and transmitted to the relay 9C by conductors 11 and 12. With a vehicle in block B, as shown, the current supply for the relay 9C will be shunted out by the vehicle, thereby deenergizing relay 9C and permitting contacts 13, 14, 15 and 16 to fall. A relay 17 may be provided which is continuously energized and normally tends to hold the contacts in open position as shown in Figure 1B; the relay 9C when energized being sufficient to overcome the action of the relay 17.

The right-of-way signal system will not be described in detail for it is of the conventional type and is well understood by those skilled in the art. It will suffice to say that when the contact 13 falls current supplied to the pole line 18 will fail; current being normally supplied from the transformer 10 through conductor 19 and contact 13 to pole line 18, cross-arms 18', for the pole line 18 being shown in Figures 1A and 1B. The other side of the pole line is permanently connected to the other side of the transformer winding by conductor 20, whereby current of a desired voltage, say 55 volts A. C., is supplied to the pole line for the next rearward block section when relay 9B or 9C is energized. When current is so supplied it is effective for energizing a suitable line relay in that particular block section.

Falling of contact 14 causes an interruption in the flow of current to the relay 21C of block C. Contact 15 falls into engagement with a contact 22 causing connection between the conductor 23 of the transformer 10C and a conductor 24 connected to one side of a danger signal which may, if desired, be in the form of a colored light or a semaphore signal. The other side of the signal is permanently connected to the common conductor 25 which is in turn connected to the conductor 26 from the transformer winding. Thus current, which may be 10 volts at 25 cycles, is furnished from transformer 10C for operation of a suitable danger signal. When a vehicle occupies block B, a danger signal is presented at the entrance end of that block to warn oncoming vehicles in block C. When contact 16 drops into engagement with contact 26, current from a suitable source, which may be 110 volts A. C., is carried to a motor 27 and magnets 28 of a suitable interrupter by the conductors 16' and 26'. The other side of the motor and magnets is permanently connected to one side of the current supply by the conductor 29.

The interrupter is illustrated in Figure 3 and comprises a constant speed motor 27 which may have a 1/20 horse power rating and turn at about 1500 R. P. M., driving a worm 30 engaging a worm wheel 30' which is keyed to a shaft 31. A cam wheel 32 is also keyed to the shaft 31 and is adapted for engagement with a rocker arm 33 pivoted at 34. The magnets 28 are illustrated in energized position with a pivoted support 35 for the vacuum contact 6 in engagement therewith. The support 35 is pivoted at 36 and is provided with a counterweight 37 normally holding the support away from the magnets. Thus, the vacuum contact is normally closed and upon deenergization of the magnets will always return to closed position, regardless of the position of the contact actuating cam wheel 32, thereby avoiding any possible failure of current to the track rails upon deenergization of the magnets 28.

The vacuum contact is of the type having a glass stem 38 which upon being moved by an engaging arm breaks contact. Upon energization of the magnets 28, the support 35 is brought into a position in engagement with the magnets and upon rotation of the cam 32, the rocker arm 33 is moved about the pivot 34, whereby the end 39 of the arm 33 engages the stem 38 alternately making and breaking contact. The speed of revolution of the cam 32 determines the cycle of interruption of the current. I have found that 30 to 50 interruptions per minute are satisfactory in that they provide a readily discernible signal. Any suitable type of interrupter may be provided. I prefer to have the number of interruptions per minute relatively small in order that the consequent signal will be readily discernible. I prefer to have the interruptions less than the frequency of the current normally applied to the track which is generally 25 cycles per second, but the number of interruptions per minute may be any desired amount so long as the interrupted signal is discernible and readily distinguishable from a continuous signal.

The current supplied from the motor generator 2C for block C will, with block B occupied, pass through the switch 6 prior to entering the track rails 3. So long as the relay 9C is deenergized, the current interrupter will be operative and interrupted current will be supplied to the track rails of block C; the current supplied being 100 cycles at 10 volts.

In order to insure that signalling current will be impressed upon the track rails 3 only in the event the current supply for the interrupter is functioning, the protective relay 8 is provided. This relay is energized by the current supply for the interrupter, being connected to one side thereof by the conductor 29. The other side of the relay coil is connected to the contact 40 and thence to the other side of the current supply by the conductor 41. Thus if the line relay 21 is deenergized, the protective relay will be energized. The protective relay is also energized when the contact 16 of the track relay 9C or 16B of track relay 9B is in raised position, being connected by the conductor 42. It will be seen from this that the protective relay 8 is energized so long as the current supply for the interrupter is operative regardless of the energization or deenergization of the track and line relays. Current can pass from the motor generator 2 to the rails 3 only through the contact 7 which is controlled by energization of the protective relay.

From the foregoing it will be understood that, when the next preceding block section is clear, current of a predetermined frequency will be uninterruptedly supplied to the track rails of the instant block but if the next preceding block be occupied, current which will be of the same predetermined frequency will be supplied interruptedly; the frequency of the interruption being governed by the speed of the interrupter.

Referring again to the right-of-way signals, we find that with a given block occupied, the signal at the entrance end thereof may be in the form of a red light as above set forth. Assuming now that blocks A and an assumed block in advance thereof (Figure 1A) are clear, both the line relay 21B and the track relay 9B will be energized and current will be conducted from the transformer 10B through the conductor 23B, contact 15B, conductor 43, contact 44 of the line relay and conductor 45 to the light or other signal, which may be colored green or may be in the form of a semaphore. The circuit is completed through the common conductor 25B in the same manner as previously described.

In the event of deenergization of line relay 21B by reason of a vehicle occupying the assumed block, two sections in advance of block B, the track relay 9B will be energized because block A is clear and current will be carried from the transformer 10B, through conductor 23B, contact 15B, conductor 43, contact 44 and conductor 46 to the signal which may be of the same form as above described but colored yellow to indicate to a vehicle in block B and about to enter block C that conditions are not clear two blocks in advance.

*The current pickup and cab signal mechanism*

The vehicle V operating upon the tracks 3 is provided with any suitable device for picking up the current impressed thereon by the motor generator 2 for the block in which the vehicle is travelling. I prefer to use a direct electrical contact type of pickup such as described in my Patent No. 1,697,624 issued January 1, 1929, providing a shunt transformer around the front axle of the vehicle, although a plurality of transformers, as shown in my prior patent, having their secondaries connected in series, may be utilized if desired.

I have found in an actual installation on a direct current propulsion type of electric train having the armature spindle of the motor operating as an axle, that substantially all direct current interference, which is normally a source of great difficulty in relay controlled signals, may be eliminated by the use of a direct contact pickup such as illustrated in Figure 2.

This pickup comprises a pair of plates 47, suitably connected to the bearing boxes, between which plates is clamped a core type transformer 48 having a winding 49 which is connected to the input of a tuner 50. The transformer 48 is connected for line transformation by leads L connected to the respective bearing boxes or to brushes wiping the ends of the axle. The leads L are connected to the transformer core so that current may flow through the core from one end of the axle to the other.

Other types of pickup devices may be used in place of the direct contact type such for example as the inductive type pickup commonly used in train controls.

The tuner 50 is adapted to respond to the current of predetermined frequency impressed upon the rails, which in the embodiment being described is 100 cycles. The output of the tuner 50 is directed to the input of an amplifier 51 which may be of the conventional vacuum tube type. It is desirable to pass the picked-up current through a tuner before amplification in order that any current other than the desired current will be attenuated prior to amplification. An amplifier will be found desirable in most instances in order to insure that sufficient current will be transmitted to the control mechanism for positive action, although I have found that if the block sections are not over 3000 feet long and a super-sensitive relay is employed, sufficient current for positive action of the relay is picked up without amplification.

The tuner 50 may be of the resonant circuit type set to respond most efficiently to the predetermined frequency it is desired to pick up. It may also be of the "band pass" type rejecting frequencies higher and lower than the desired frequency, provided the predetermined frequency is within its range of sensitivity.

The current which passes from the amplifier 51 is directed to a master relay 52 which is responsive to the current supplied by the generator 2 through the tuner 50 and the amplifier 51. Upon energization of the relay 52, the contact 53 which may be secured to the armature of the relay 52 makes a circuit from a suitable source of current S such as the car battery or a 110 volt supply from the power line through wires 54 and 55 to a signal light 56 which may be colored as desired to indicate a clear track or proceed condition; the contact 53 serving to control the supply of current from the conductor 54, and the wire 55 being permanently connected to one side of the light signal and to the source S.

If desired a train stop or control mechanism may be associated with the cab signal and may be in the form of a device for applying the vehicle brakes as shown in Figure 2. A suitable device may be a solenoid operated valve 57 which is preferably inter-connected with the vehicle braking system exhausting to atmosphere, gradually applying the vehicle brakes and, if desired, effective for sounding a signal such as an air operated whistle 58. Any suitable speed or stop control may be substituted, however, for the brake applying device shown. The interposition of the electrically controlled valve may have to be varied depending upon the braking system employed on the particular vehicle to be controlled.

The valve 57, which is normally operative, is held against operation by energization of solenoid 59. Current for energization is supplied from source S to one side 60 of the coil by the permanent conductor 54 while the other side 61 is supplied from the conductor 55 through a contact 62 operated by a control relay 63.

The operation of the control relay 63 is controlled by the action of the master relay 52. When the master relay 52 is energized, the contact 53 interconnects one side 64 of the control relay 63 with the source S through the conductor 54. The other side 65 of the control relay 63 is permanently connected to the source S through the conductor 55. Thus, control relay 63 is energized only upon energization of master relay 52; the "proceed" light 56 which may be colored green is brought into circuit and the normally operative control valve 57 is rendered inoperative by energization of its controlling solenoid 59.

Assuming now that track conditions in the block occupied by the vehicle are not clear by reason of occupancy of the block by another vehicle, a broken rail or other obstruction, the current supplied by the motor generator 2 would not reach the pickup mechanism, either because of the shunting thereof by a preceding vehicle or because of the break in the rails. As a result, the relay 52 will not be energized, permitting contact 53 to open, breaking circuit for the control relay 63 and the light signal 56, which thereby extinguishes the "proceed" signal and permits the control valve 57 to open applying the vehicle brakes and sounding the whistle 58.

As a "danger" signal for the vehicle operator, a signal light 66, which may be colored red, is provided in the cab. One side of the light is permanently connected to the source of current S through the conductor 54 and the other side is inter-connected to the source through a contact 67 engageable with the contact 62 of the control relay 63. As pointed out above, when the current supplied to the rails is not picked up by the vehicle, the control relay is deenergized, the contact 62 thereof falling into engagement with contact 67 thereby completing the circuit for the "danger" light 66.

I have found that neon lights provided with green and red lenses are admirably suited for cab signalling use because the neon lights require no filament and are particularly adapted to intermittent flashing since they become dark immediately upon interruption of the current supplied thereto.

As previously pointed out, when a vehicle or other obstruction, such as a broken rail, appears in a given block, the current supplied to the next rearward block is regularly interrupted and the current supplied interruptedly. As an example of the signal presented upon such condition, assuming a vehicle enters block C with block B occupied, current supplied to the track rails 3 of block C will be interruptedly supplied through the switch 6. The tuner 50 is responsive to the current and by virtue of the interruptions the master relay 52 operates intermittently, and consequently the contact 53 places the "proceed" signal 56 in circuit upon energization and, during the period of current failure, the contact 62 of the now deenergized control relay 63 falls bringing the danger signal 66 into circuit and also deenergizing the control solenoid 59 sounding the whistle 58 and, if desired, causing the application of the vehicle brakes. It will be observed that the "proceed" and "danger" signals are intermittently flashed, first one and then the other, upon restricted track conditions in the block in advance; the frequency of the flashing being determined by the speed of the interrupter. In the event a safety lock be provided for the control relay 63, as more fully hereinafter described, the danger signal will be permanently lighted so long as the relay be locked and the proceed signal will be alternately illuminated and extinguished. The signals will be alternately operated for periods of two seconds if the interrupter illustrated in Figure 3 is operating at thirty revolutions per minute. A signal of this type is readily discernible and cannot be easily overlooked or misinterpreted.

So long as the preceding block is occupied the current supplied to the instant block will be interrupted and the master relay will be alternately energized and deenergized, but just as soon as the vehicle occupying the next preceding block vacates that block current will again flow through the track rails of that block energizing the track relay 9 and thereby rendering the interrupter inoperative and supplying uninterrupted current to the track rails in the next rearward section.

With a flashing signal of this type, it will be readily appreciated that interference should be eliminated for successful operation. In the installation above refered to, direct current interference has been completely eliminated by my pickup and the relays are positively operative without "chattering" normally caused by interference.

The control lock and manual reset

It is desirable in some instances to provide a control mechanism effective for stopping the train in the event of any restricted track condition as a check on the alertness of the operator. This control is preferably manually releasable, but when so released may be provided with a signal for indicating to the passengers that the operator has observed and is responding to the restricted condition.

In my preferred embodiment, I provide a lock 68 which is held in closed position by suitable means such as a spring 69. The lock 68 while permitting the contact 62 to fall upon deenergization of the control relay 63, holds the contact in that position. Thus, if the instant block is occupied, upon entrance of a vehicle to be controlled or during its operation therein, the contact 62 will fall putting the "danger" signal into operation and effecting operation of the stop mechanism. The latch 68 will hold the contact in that position until manually released. The lock operates in the same manner if the next preceding block is restricted for upon the first interruption of the current supply, the latch 68 will fall and will be automatically locked. This provides a highly desirable check on the vehicle operator particularly since it is on the safety side and will be effective for stopping the vehicle if the operator is incapacitated for any reason.

It will be understood that when the latch 68 is holding the contact 62 in control position during restricted conditions in a preceding block, the "proceed" signal will be intermittently operative by reason of the interrupting of the current supplied to the rails in the instant block effecting alternate energization and deenergization of the master relay 52.

In order that the operator may use his own judgment in the further control of the vehicle, an acknowledging or reset button 70 is provided which is effective for inter-connecting a solenoid 71 with the source S through a contact 72 engaging a contact 73 connected to the conductor 55 from the source S. The other side of the coil is connected by the wire 74 to the other side of the source S through conductor 54. Upon energization of the solenoid 71, the latch 68 is raised permitting the contact 62 to function in its normal manner. The reset button 70 is also effective for energizing the solenoid 59 for the control valve 57 by inter-connecting the contact 75 through contacts 72 and 73 with the side of the source S opposite to that normally connected to one side of the solenoid coil.

A signal 76 may be provided in the car in a position easily visible to the passengers or on a steam propelled train to the fireman. One side 77 of the light 76 is normally connected to the source S through conductor 54 and the other side 78 is connected to wire 55 through contacts 72 and 73, whereby upon operation of button 70 current will be supplied for operation of the acknowledging light.

The operator in order to avoid automatic operation of the control mechanism must hold the reset button in position until the track conditions are again clear as evidenced by failure of operation of the "danger" signal and permanent operation of the "proceed" signal. During the time the operator holds the acknowledging button in place, the light will be operative to advise the passengers or the fireman that the operator is responding to a restricted track condition.

The acknowledging button is effective for releasing all automatic control, but permits constant operation of the cab signal. This is desirable in order that the vehicle operator be always advised of track conditions.

The mode of operation of my cab signal and train stop system has been described in connection with the description of the mechanisms employed for effectuating the various desired signals and control. Obviously other types of signals may be substituted for the lights shown and the control may be eliminated if desired or other control mechanism substituted. My system is economical and highly efficient due to the fact that but a single frequency of current need be applied to the track rails for indicating varying track conditions and also because only one master relay responsive to the track frequency is required, thereby eliminating the problem of interference between relays tuned for various frequencies.

While I have described and illustrated the preferred embodiment of my invention, it will be understood that the invention is not so limited but may be otherwise embodied within the scope of the following claims:

I claim:

1. In a cab signal system, a pair of track rails divided into block sections, means for impressing upon the rails of each section an electrical current of a predetermined frequency, signalling means including a signal operative upon communication of the current from the rails thereto to indicate an advance block traffic condition and a signal operative upon failure of the current to indicate the instant block traffic condition, means for communicating the current from the rails to the signalling means and means controlled by a traffic condition in one section for regularly interrupting the current supplied to the rails in a succeeding section at such frequency to alternately operate said signals at readily discernible intervals to indicate a traffic condition in a block section intermediate said advance block and said instant block.

2. In an automatic train control system, a pair of track rails divided into block sections, means for impressing upon said rails an electrical current of a predetermined frequency, a master relay responsive to the frequency of said current, a control relay in circuit with said master relay, said control relay being energized upon communication of said current to said master relay, a pair of signal lights in circuit with said control relay, one of said lights being operative upon energization of said control relay and the other light operative upon deenergization thereof and means controlled by traffic conditions in an advance block for regularly energizing and deenergizing said control relay.

3. In a cab signal system, signalling means including a signal operative upon communication of current thereto and a signal operative upon failure of said current, a source of current, means for communicating current from said source to said signalling means, and means controlled by traffic conditions in an advance block for supplying said current interruptedly for intervals sufficiently long to alternately operate said signals for readily discernible periods.

4. In a cab signal system, a source of current, signalling means including a light operative upon communication of said current to said signalling means to indicate one traffic condition, a signal operative upon failure of communication of said current to indicate another traffic condition and traffic controlled means in an advance block for interrupting said current to alternately operate the light and the signal to indicate a different traffic condition, and means for communicating said current to said signalling means.

5. In an automatic train control system, a pair of track rails divided into block sections, means for impressing an electrical current upon said rails, a relay responsive to said current, said relay being energized upon communication of said current thereto, a pair of signal lights in circuit with said relay, one of said lights being operative upon energization of said relay and the other light being operative upon deenergization thereof, means controlled by traffic conditions in an advance block for regularly energizing and deenergizing said relay, latching means adapted to lock said relay upon deenergization thereof against operation upon reenergization of the relay whereby one of said signal lights will be energized continuously and the other of said lights will be alternately operative upon regular energization and deenergization of said relay.

MAX THEODORE WINTSCH.